JACOB GARDNER.
Improvement in Machines for Boring Hubs and Tenoning Spokes.
No. 125,803.   Fig. 1.   Patented April 16, 1872.
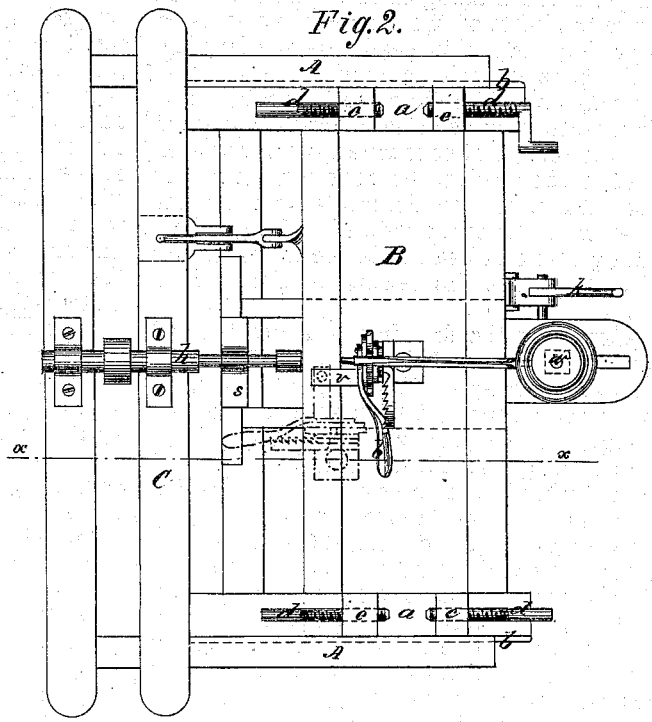
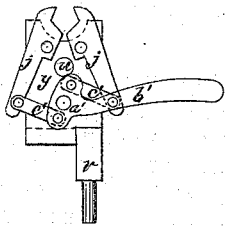
Fig. 3.
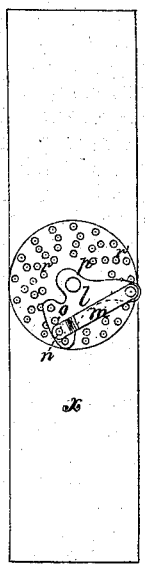
Fig. 4.
Witnesses:
G. Matthys
C. W. Pettit
Inventor:
J. Gardner.
Per ——— Attorneys.

125,803

UNITED STATES PATENT OFFICE.

JACOB GARDNER, OF BIGLER, PENNSYLVANIA.

IMPROVEMENT IN MACHINES FOR BORING HUBS AND TENONING SPOKES.

Specification forming part of Letters Patent No. 125,803, dated April 16, 1872.

Specification describing a new and Improved Machine for Boring Hubs and Tenoning Spokes, invented by JACOB GARDNER, of Bigler, in the county of Adams and State of Pennsylvania.

Figure 1 is a transverse sectional elevation of the machine as it appears when used for boring hubs. Fig. 2 is a top view of the same as it appears when used for tenoning the spokes; and Figs. 3 and 4 are views of details.

This invention relates in part to a machine for boring into wheel-hubs the radial holes necessary for the making of the mortises which receive the butts of the spokes, the invention comprising under this head a device for placing the hubs at such an inclination from the perpendicular while they are being bored as may serve to produce holes sufficiently inclined to the axis of the hubs to give the spokes, when placed in such holes, the required "dish" or slant. The invention also relates to a machine for tenoning the outer ends of spokes, and includes under this head a device for clamping the spokes while the tenons are forming on them.

Referring to the drawing, A A are the end upper cross-pieces of the frame C of the machine, said cross-pieces being grooved lengthwise of their inner sides. $a$ are the sills of a carriage, B, that slides transversely of the frame C, tongues $b$, formed lengthwise of said sills, entering the grooves of the cross-pieces A. $c\ c$ are vertical standards, which rise, two from each end of the carriage B, at a suitable distance apart, through each of which standards passes a screw-bolt, $d$, the same being provided with cranks for turning the screws $d$ inward toward each other, or outward away from each other. The object of thus turning the screws $d$ is to cause them to clamp or unclamp a separate frame, X, Figs. 1 and 4. Said frame includes legs $e$, which extend vertically downward from the ends of the bar X, which bar is of the same length as the carriage B. The legs $e$ are placed between the standards $c$, and then held by the screw $d$; and by turning the screws $d$ on one side more than the screws $d$ on the other, the legs $e$ are made to lean in either direction required. The bar X partakes of the inclination of the legs $e$, and communicates it to the hub, which is supported beneath the bar X on spindles $f$ and $z$, projecting inwardly from the bar and carriage, respectively. In this way the hub receives the degree of inclination necessary to the production of holes therein of the proper slant for the requisite "dish" of the spokes. These holes are bored in the hub by a bit, $g$, supported in a horizontal mandrel, $h$, that is mounted in the frame C opposite the spindle $f$. The mandrel $h$ receives rotation from any suitable motor. The hub is fed up to the bit or drawn away from it by drawing the sliding carriage B toward or from the mandrel by means of a lever, $k$, and connecting-rod $i$, or other suitable means. The spindle $f$ is rotated for the purpose of presenting a fresh point to the bit after one hole is bored, by means of a two-armed lever, $l$, placed on the top of the bar X, to which lever the upper end of the spindle $f$ is secured. To the end of one of the arms $l$ a latch-bar, $m$, is pivoted, which latch-bar has a pin, $n$, extending downward from its opposite extremity, and passing through either one of four holes, $o$, made near the end of the other arm $l$. In the circular plate $p$, that is secured to the upper side of the bar X, beneath the two-armed lever $l$, are four concentric series of holes, $r$, each one of which series is at the same distance from the spindle $f$ as the corresponding hole $o$ in the arm $l$, so that the pin $n$ of the latch-bar, when it is entered in one of the holes $r$, locks the spindle $f$, and when it is raised above the plate $p$ leaves the spindle $f$, and the hub that is mounted upon it, free to rotate. The number of holes in each series, $r$, is greater than in the one next within it, and less than in that next outside of it, being, in this instance, ten for the innermost series, twelve for the next, fourteen for the next, and sixteen for the outermost—this difference being made for the purpose of enabling a different number of holes to be bored in one hub from that bored in another. When spokes are to be tenoned the boring-bit $g$ is removed from the mandrel, and its place supplied by the ordinary hollow auger or tenoning-head. The carriage B is furnished with a cross-bar, $q$, one end of which is forked, its branches embracing the standard $s$, through which the mandrel $h$ passes; the other end of the cross-bar $q$ is forked, and between its forks $t$ is placed a screw-bolt, $w$, which extends far enough above the cross-bar to form a center on which to place the hub, in which are inserted the spokes whose extremities are to be tenoned. Between the bolt $w$ and standard $s$ is an arm, $v$, which is suitably pivoted to one of the carriage-ways, and is made so that it and the mechanism thereto attached, and hereinafter described, may be turned to one side, so as to be out of the way of the hub during the boring operation hereinbefore set forth. The arm $v$ is provided at its free end with a plate, $v'$, which is slotted vertically, and through the slot passes a set-screw, $u$, that enters a plate, $y$, which said set-screw holds up to the plate $v'$, yet so that the plate $y$ may be raised or lowered on loosening the set-screw $u$. Crosswise of the tops of both the plates $v'$ and $y$ are made grooves of sufficient size to receive one of the spokes. The height of the plate should not exceed that of the tenoning-head above the cross-bar $q$. The plate $y$ bears two levers, $j$, pivoted one at each side of the groove. To the plate $y$ is also pivoted, between the lower arms of the levers $j$, the head $a'$ of a lever $b'$, to opposite ends of which head are jointed the extremities of bars $c'$, the other extremities of which are jointed to the lower ends of the levers $j$. This arrangement enables the upper or shorter arms of the levers $j$ to be closed upon the spoke that is placed between them, or to be unclamped therefrom, by simply working the lever $b'$ down or up. A rack, $d'$, of bow-shape, is secured at its ends to the plate $v$, and serves to fasten the lever $b'$ in any desired position. When the levers $j$ are thus clamped upon the spoke it is then to be fed up to or drawn away from the tenoning-head by the same means as the hub is fed up to or drawn away from the boring-bit.

Having thus described my invention, what I claim as new, and desire to secure by Letters Patent, is—

1. The arrangement of the standards $c$ and screw-bolts $d$ with the bar X, legs $e$, and spindle $f$, as specified.

2. The arrangement of the spindle $f$, two-armed lever $l$, latch-bar $m$, and perforated plate $p$ with the bar X, standards $c$, legs $e$, and screw-bolts $d$, substantially as shown and described.

3. The arrangement of the hinged and slotted plate $v$, plate $y$, levers $j$, headed lever $b'$, connecting-rod $c'$, and bow-rack $d'$, as set forth.

JACOB GARDNER.

Witnesses:
 GEORG GROUP,
 PETER GROUP.